United States Patent
Goering et al.

(10) Patent No.: US 9,504,203 B2
(45) Date of Patent: Nov. 29, 2016

(54) TRANSMISSION ARRANGEMENT FOR HARVESTING VEHICLES

(71) Applicant: DEERE & COMPANY, Moline, IL (US)

(72) Inventors: Kevin J. Goering, Cambridge, IA (US); James T. Noonan, Bondurant, IA (US)

(73) Assignee: Deere & Company, Moline, IL (US)

( * ) Notice: Subject to any disclaimer, the term of this patent is extended or adjusted under 35 U.S.C. 154(b) by 39 days.

(21) Appl. No.: 14/586,131

(22) Filed: Dec. 30, 2014

(65) Prior Publication Data

US 2016/0183467 A1   Jun. 30, 2016

(51) Int. Cl.
| | |
|---|---|
| A01D 69/08 | (2006.01) |
| B60W 10/101 | (2012.01) |
| B60W 10/30 | (2006.01) |
| A01D 69/00 | (2006.01) |
| F16D 48/06 | (2006.01) |
| B60W 20/00 | (2016.01) |

(52) U.S. Cl.
CPC ............ *A01D 69/08* (2013.01); *A01D 69/002* (2013.01); *B60W 10/101* (2013.01); *B60W 10/30* (2013.01); *B60W 20/30* (2013.01); *F16D 48/06* (2013.01)

(58) Field of Classification Search
CPC ... A01D 69/08; B60W 10/101; B60W 10/30
See application file for complete search history.

(56) References Cited

U.S. PATENT DOCUMENTS

| | | | | |
|---|---|---|---|---|
| 3,520,119 A * | 7/1970 | Brace | ..................... | A01D 46/08 56/10.7 |
| 7,007,768 B2 * | 3/2006 | Nishi | ..................... | B60K 28/04 180/273 |
| 2009/0076690 A1 * | 3/2009 | Guo | ......................... | B60K 6/12 701/51 |
| 2015/0008057 A1 * | 1/2015 | Lo | ........................... | B60L 11/12 180/165 |
| 2015/0292608 A1 * | 10/2015 | McKinzie | .............. | B60K 6/445 74/661 |
| 2016/0174465 A1 * | 6/2016 | Kohls | ..................... | A01F 12/58 414/518 |

* cited by examiner

*Primary Examiner* — Tisha Lewis
(74) *Attorney, Agent, or Firm* — Lorenz & Kopf, LLP (57) ABSTRACT

A transmission arrangement is disclosed for a cotton harvester. A power take-off shaft may be configured to receive rotational power from an engine of the cotton harvester. An infinitely variable transmission may be configured to sum mechanical power from an infinitely variable power source and the engine and to output the summed power at a variable output shaft. A clutch arrangement may be configured, in a first state, to disconnect a harvesting unit of the cotton harvester from the power take-off shaft and route power from the variable output shaft to the harvesting unit. The clutch arrangement may be further configured, in a second state, to disconnect the harvesting unit from the variable output shaft and route power from the engine to the harvesting unit via the power take-off shaft.

16 Claims, 6 Drawing Sheets

TRANSMISSION ARRANGEMENT FOR HARVESTING VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to vehicle transmissions, including transmission arrangements for powering ground drives and harvesting units of harvesting vehicles.

BACKGROUND OF THE DISCLOSURE

Typical harvesting vehicles (or "harvesters") may be configured such that various components, including ground drive and harvesting components, may be powered via one or more infinitely variable power sources ("IVPs"), such as one or more hydraulic or electric motors. For example, in typical cotton harvesters, various hydrostatic systems may be utilized to separately power a ground drive (e.g., via a hydraulic motor powering two wheels via a differential gear set, or separate hydraulic motors at each wheel), and various harvesting units. This may be useful, for example, in order to provide variable control over the operating speeds of the ground drive and the harvesting units, as may be required to synchronize (or de-synchronize) operating speeds of the harvesting units from the current ground speed of certain cotton harvesters (e.g., cotton pickers). However, the use of hydraulic motors (or other IVPs) in this way may impose unavoidable efficiency losses due to the need to convert mechanical power from the engine to hydraulic (or electrical, or other) power to operate the IVPs, then convert the hydraulic (or electrical, or other) power back to mechanical power using the IVPs, in order to power the ground drive and harvesting units. It may be useful, accordingly to provide a transmission arrangement allowing direct mechanical powering of various harvester components (e.g., various harvesting units), while also providing the variable speed control facilitated by an IVP.

SUMMARY OF THE DISCLOSURE

According to one aspect of the disclosure, a power take-off shaft may be configured to receive rotational power from an engine of a cotton harvester. An infinitely variable transmission may be configured to sum mechanical power from an infinitely variable power source and the engine and to output the summed power at a variable output shaft. A clutch arrangement may be configured, in a first state, to disconnect a harvesting unit from the power take-off shaft and route power from the variable output shaft to the harvesting unit. The clutch arrangement may be further configured, in a second state, to disconnect the harvesting unit from the variable output shaft and route power from the engine to the harvesting unit via the power take-off shaft.

In certain embodiments, a transmission control unit may be configured to place the clutch arrangement in the first state when the harvester is traveling below a maximum synchronized speed. The transmission control unit may be further configured to place the clutch arrangement in the second state when the harvester is traveling above the maximum synchronized speed. The clutch arrangement may be further configured, in a third state, to disconnect a ground-engaging element of the cotton harvester from the variable output shaft and to route power to the harvesting unit from at least one of the power take-off shaft and the variable output shaft.

In certain embodiments, the power take-off shaft may be configured to receive rotational power directly from the engine and to transmit the received rotational power directly to the harvesting unit. The power take-off shaft may be configured to bypass the infinitely variable transmission to transmit power from the engine to the harvesting unit.

In certain embodiments, a variable drive mechanism may be configured to transmit power from the engine to the harvesting unit with a variable effective gear ratio. The variable drive mechanism may be further configured to vary the effective gear ratio such that the harvesting unit operates at a substantially constant speed over a range of operating speeds of the engine, including when the engine is operating above a maximum synchronized speed.

In certain embodiments, the clutch arrangement may include first and second clutch devices. The first clutch device may be configured to route power from the variable output shaft to the harvesting unit, when the clutch arrangement is in the first state. The first clutch device may receive power from the variable output shaft via a differential gear set that is configured to power the ground-engaging element. The second clutch device may be configured to route power from the engine to the harvesting unit, via the power take-off shaft, when the clutch arrangement is in the second state.

In certain embodiments, a gear arrangement may be configured to transmit power directly from the variable output shaft to the harvesting unit, when the clutch arrangement is in the first state, or to transmit power directly from an output shaft of the engine to the power take-off shaft. The gear arrangement may be disposed between the infinitely variable transmission and a differential gear set that is configured to power the ground-engaging element. The gear arrangement may be disposed between the engine and the infinitely variable transmission.

According to another aspect of the disclosure, a power take-off shaft may be configured to receive rotational power from an engine of a cotton harvester. An infinitely variable transmission may be configured to sum mechanical power from an infinitely variable power source and the engine and to output the summed power at a variable output shaft to power a ground-engaging element of the cotton harvester. A clutch arrangement may be configured, in a first state, to route power from the power take-off shaft to the harvesting unit such that the harvesting unit rotates in a first direction. The clutch arrangement may be further configured, in a second state, to route power from the power take-off shaft to the harvesting unit such that the harvesting unit rotates in a second direction different from the first direction.

In certain embodiments, first and second gears may be attached to the power take-off shaft and an idler gear component may engage the second gear. When the clutch arrangement is in the first state, power may be transmitted from the first gear to the harvesting unit. When the clutch arrangement is in the second state, power may be transmitted from the second gear to the harvesting unit via the idler gear component.

In certain embodiments, a first clutch device may be disposed between the harvesting unit and the power take-off shaft, and a second clutch device may be disposed between the harvesting unit and the power take-off shaft. The first clutch device may be configured to engage in the first state of the clutch arrangement, in order to route power from the first gear to the harvesting unit, and to disengage in the second state of the clutch arrangement, in order to disconnect the first gear from the harvesting unit. The second clutch device may be configured to disengage in the first state of the clutch arrangement, in order to disconnect the second gear from the harvesting unit, and to engage in the second state of the clutch arrangement, in order to route power from the idler gear component to the harvesting unit. A variable drive mechanism may be configured to transmit power from the engine to the harvesting unit with a variable effective gear ratio.

According to still another aspect of the disclosure, a power take-off shaft may be configured to provide operating power to a harvesting unit of a cotton harvester. A transmission assembly may be configured to receive power from the engine via one or more of a multi-stage gear box and an infinitely variable transmission, in order to rotate a transmission output shaft. A clutch arrangement may be configured to, in a first state, disconnect the harvesting unit from the power take-off shaft and route power from the transmission output shaft to the harvesting unit. In a second state, the clutch arrangement may be configured to disconnect the harvesting unit from the transmission output shaft and route power from the engine to the harvesting unit via the power take-off shaft.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed transmission arrangement, as shown in the accompanying figures of the drawings described briefly above. Various modifications to the example embodiments may be contemplated by one of skill in the art.

As used herein, "direct" transmission or power (or transmission of power "directly") may indicate that power is transmitted between devices without a significant change in form. For example, mechanical power provided from one device (e.g., a motor) to another device (e.g., a mechanical implement) via various shafts and gears may be considered as transmitted "directly" between the two devices because the power is transmitted solely in mechanical form. In contrast, where mechanical power from one device is converted to hydraulic (or electrical, or other) form for transmission to another device, then reconverted to mechanical form for execution of various operations, the power may not be considered as transmitted "directly" between the two devices.

Also as used herein, "between" may be indicate the relationship of various components along a power-transmission path, rather than necessarily the relationship of various components in physical space. In this regard, a first power-transmission component may be viewed as being "between" two other components if power may flow between the two other components via the first component, even if the first component is not disposed in the physical space separating the two components. For example, if power is transmitted in a first direction by an electric motor to a gear arrangement, then routed by the gear arrangement to a working unit by a shaft that extends past the electric motor in a second direction, the gear arrangement and the shaft may be viewed as being "between" the electric motor and the working unit even though the gear arrangement (and part of the shaft) may not occupy the physical space separating the electric motor and the working unit.

As noted above, during operation of a harvester, such as a cotton harvester, it may be useful to control the operating speeds of a ground drive and of various harvesting units of the harvester. For example, in order to effectively gather cotton from a field during harvesting, it may sometimes be useful to generally synchronize operating speeds of various harvesting units of the harvester to the current ground speed of the harvester (i.e., to cause the harvesting units to operate with rotational speeds that are generally proportional to the ground speed of the harvester). Above certain ground speeds, however, synchronizing the operating speed of the harvesting units to the ground speed may result in excessive operating speeds for the harvesting units. As such, it may be useful, at certain times, to operate the harvesting units at operating speeds that are not synchronized with the ground speed of the harvester. Among other benefits, the disclosed transmission arrangement may facilitate such synchronizing and non-synchronizing control of harvesting units.

In certain embodiments, the disclosed transmission arrangement for a harvester may include an infinitely variable transmission ("IVT"). Generally, an IVT may be viewed as a transmission device or arrangement configured to sum (or otherwise combine) power from an engine (or similar power source) and an IVP. In various known configurations, an IVT may include a summing gear set, such as summing planetary gear sets. In such configurations, for example, an IVP such as an electric or hydraulic motor may provide rotational power to one component of the summing gear set (e.g., one of a sun gear, ring gear, or planetary gear carrier of a planetary gear set) and an engine (or other power source) may provide rotational power to another component of the summing gear set (e.g., another one of the sun gear, ring gear, or planetary gear carrier). Through control of the engine, the IVP, or the summing gear set (e.g., through selective braking of various components of a planetary gear set), an output component of the summing gear set (e.g., yet another one of the sun gear, ring gear, or planetary gear carrier) may provide rotational power representing the sum (or other combinations) of the input powers from the IVP and the engine. In certain embodiments, a portion of the output power from the engine may be converted to a different form (e.g., hydraulic or electrical power) in order to power the IVP. In certain embodiments, the IVP may utilize another power source, such as a battery, hydraulic accumulator, or other energy storage device.

The disclosed transmission arrangement may also include a clutch arrangement in communication with the IVT. A clutch arrangement may generally include one or more clutch devices, which may be configured and controlled in a variety of ways. For example, various clutch arrangements may include clutch devices configured as wet clutches, dry clutches, dog-collar clutches, shift collars, synchronizers, one-way clutches, and so on. In certain embodiments, a clutch arrangement may include brake devices for stopping rotation of various components. In certain embodiments, a clutch arrangement may include various other devices and components, including control electronics, hydraulic lines and control systems, various shafts or gears, and so on.

A clutch arrangement (and various clutch devices) may be placed in various states, which may correspond to a particular routing (or non-routing) of power through the clutch arrangement (or a portion thereof). Generally, at least one state of a clutch arrangement may include a state in which the clutch arrangement routes power from one rotating component to another. For example, in a clutch arrangement with a single wet friction-clutch interposed between two rotatable shafts, one state of the arrangement (and of the wet clutch) may include an engaged state in which the wet clutch transmits (i.e., "routes") power between the two shafts. A clutch arrangement may also include states in which power is not transmitted between various components. For example, in another example state of the single-clutch arrangement noted above, the wet clutch may be disengaged, such that power is not routed between the two shafts by the wet clutch. In such a state, the clutch arrangement (and the wet clutch) may be viewed as having "disconnected" the two shafts, with respect to transmission of rotational power.

In embodiments of the disclosed transmission arrangement, a clutch arrangement may be configured to selectively route power to a harvesting unit from an output shaft of an IVT or from a power take-off shaft driven directly by an engine of the harvester. For example, in a first state, the clutch arrangement may be configured to route summed power from the engine and an IVP, as received from the IVT, to the harvesting units. In this way, where the IVT is also utilized to power a ground drive of the harvester, the operating speed of the harvesting units may be synchronized with the ground speed of the harvester. Further, in a second state, the clutch arrangement may be configured to route power directly from the engine (and not from the IVP) to the harvesting units. In this way, for example, where the output speed of the IVT exceeds a maximum operating speed of the harvesting units, the IVT may continue to drive the ground drive, but the harvesting units may be powered directly (and, for example, at constant speed) by the engine.

In certain embodiments, other functionality may also (or alternatively) be provided. For example, the transmission arrangement may be configured to provide for reverse-direction operation of the harvesting units. This may be useful, for example, in order to clear plugs of material that have accumulated in the harvesting units, or for other reasons. Likewise, the transmission arrangement may be configured to provide for operation of the harvesting units when the ground drive of the harvester is not engaged. This may be useful, for example, in order to warm up (or otherwise run) the harvesting units without moving the harvester.

In various examples discussed below, particular arrangements of shafts, gears, clutch arrangements, and other components may be presented. It will be understood that various alternative (or additional) configurations of such shafts, gears, clutch arrangements, or other components may be utilized without departing from the teachings of this disclosure. For example, a single shaft in various embodiments may be replaced, in other embodiments, with an arrangement of multiple shafts (e.g., multiple coaxial shafts, or multiple offset shafts connected by various gear arrangements). Likewise, a particular arrangement of multiple shafts in certain embodiments may be replaced (or supplemented), in other embodiments, with a different arrangement of multiple (or individual) shafts. For example, an arrangement of parallel shafts may be replaced (or supplemented) with an arrangement of nested, coaxial shafts (e.g., one hollow shaft surrounding another coaxial shaft). Further, a connection including a particular number or arrangement of gears in certain embodiments may be replaced with a connection including a different number or arrangement of gears in other embodiments. For example, a meshing between two gears to transmit power between those gears may be replaced by a meshing between the two gears, respectively, and a number of idler gears, in order also to transmit power between the two gears. Further, in certain embodiments, various example clutch arrangements may be replaced (or supplemented) with other clutch arrangements configured to provide similar power-transmission states.

It will further be understood that various changes in the direction of power transmission (or the rotational direction of transmitted power) may be accomplished using various known arrangements. As such, embodiments depicting transmission of power in a particular direction are not presented to the exclusion of similar (or other) embodiments transmitting power in other directions. For example, various embodiments below may present transmission of power from an engine to a row unit with generally parallel rotation of the various power-transmitting components (e.g., various shafts and gears). It will be understood, however, that components of certain row units may operate via rotation around an axis that is not parallel with an axis of rotation of output power from the engine (or another power source). As such, although parallel rotation may be depicted in various embodiments, various known arrangements (e.g., bevel gear arrangements, universal joints, constant-velocity joints, and so on) may be utilized to provide rotational power to (or within) a row unit along a different rotational axis than the power output from the engine.

Figure 1A:
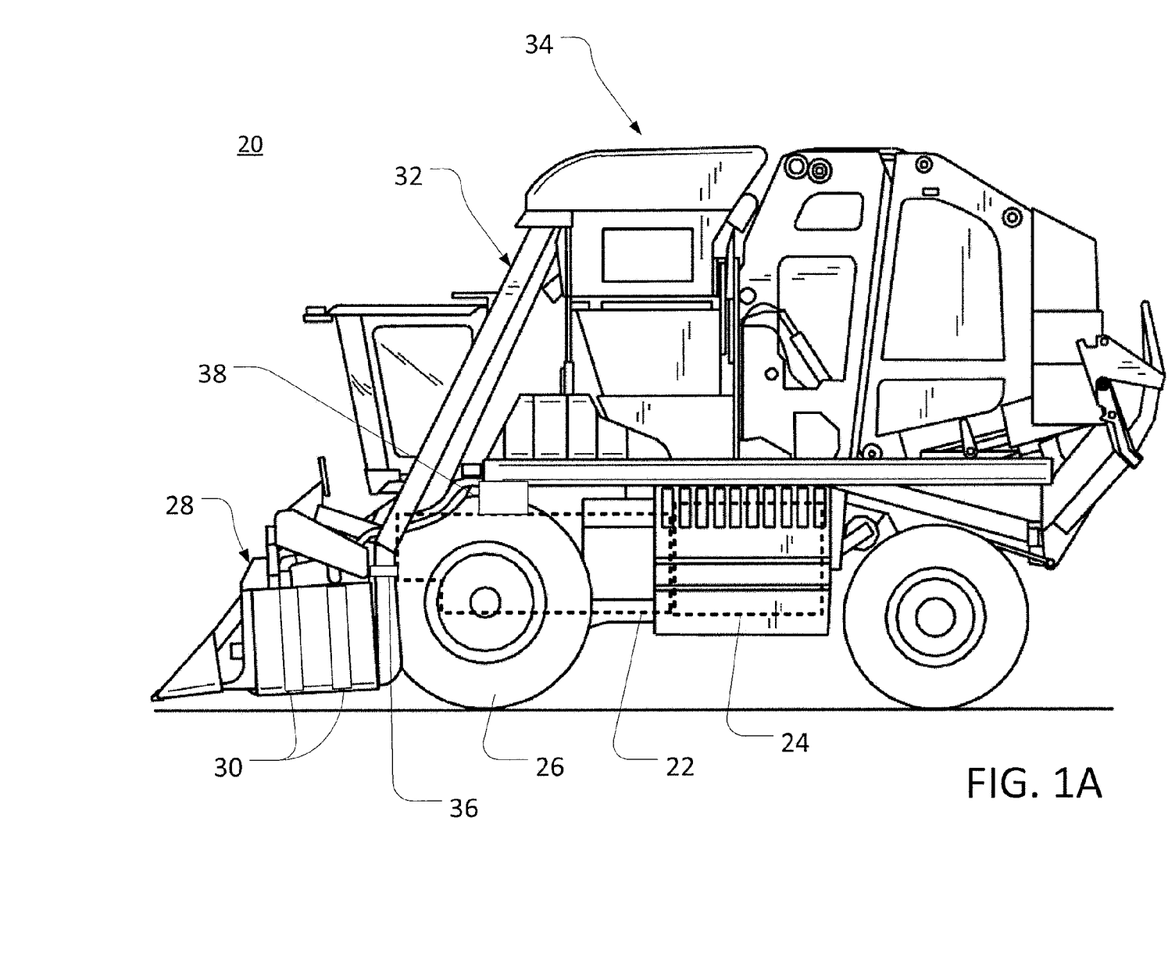
FIG. 1A is a side view of an example harvesting vehicle, configured as a cotton picker.

Embodiments of the disclosed transmission arrangement may be used on a variety of cotton harvesting (or other) vehicles, including cotton pickers and cotton strippers. Referring, for example, to FIG. 1A, a example cotton picker 20 is depicted with a transmission arrangement 22 for transmitting power from an engine 24 of the cotton picker 20 to a set of powered forward wheels 26 for moving the cotton picker 20 over the field. Generally, the transmission arrangement 22 may include various gears, shafts, clutch devices, and other components for controllably routing power from the engine 24 to the wheels 26. In certain embodiments, as discussed in greater detail below, the transmission arrangement 22 may include one or more IVTs.

The cotton picker 20 is also configured to support a set of forward harvesting (or "row") units 28 for gathering cotton. As depicted, harvesting units 28 include various drums 30 with spindles (not shown), which rotate during operation of the units 28 to pull fiber (and seed) from cotton plants. Cotton gathered by the harvesting units 28 is moved by air pressure through a duct arrangement 32 into the body 34 of the cotton picker 20 (e.g., for forming into modules). In the configuration depicted, and as discussed in greater detail below, the harvesting units 28 may also receive operating power from the engine 24 via the transmission arrangement 22. As depicted, for example, each individual harvesting unit 28 (or a set of multiple harvesting units 28) may be mechanically powered by a corresponding drive shaft 36 extending from the transmission arrangement 22 to the harvesting unit 28. In other embodiments, a different arrangement (e.g., an arrangement of various shafts, gears or other power-transmission devices) may be utilized to communicate power from the transmission arrangement 42 to the harvesting units 46.

The cotton picker 20 may include various other devices and systems. As depicted, for example, the cotton picker 20 includes a controller 38. The controller 38 may be configured in a variety of ways, including as an electronic computing device with one or more processors and memory architectures, as a programmable electronic circuit, or otherwise. In certain embodiments, the controller 38 may be disposed at other locations, including locations remotely located from the cotton picker 20. In certain embodiments, multiple controllers may be utilized. For example, the controller 38 may be configured as a transmission control unit for controlling operation of various clutch (or other) devices the transmission arrangement 22, and another controller (not shown) may be configured as an engine control unit for controlling operation of the engine 24.

Figure 1B:
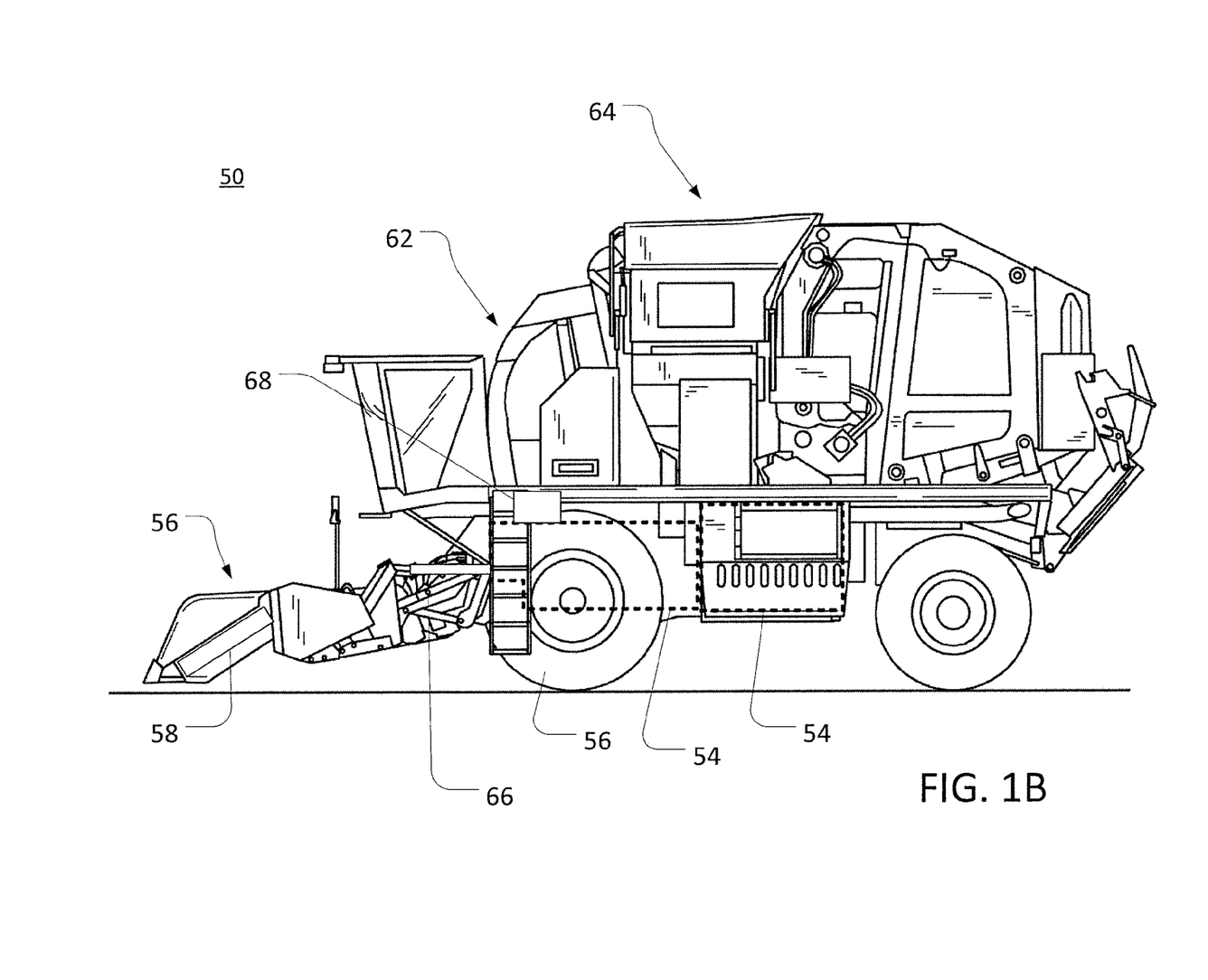
FIG. 1B is a side view of another example harvesting vehicle, configured as a cotton stripper.

As another example, referring also to FIG. 1B, an example cotton stripper 50 is depicted with a transmission arrangement 52 for transmitting power from an engine 54 of the cotton stripper 50 to a set of powered forward wheels 56 for moving the cotton stripper 50 over the field. Generally, the transmission arrangement 52 may include various gears, shafts, clutch devices, and other components for controllably routing power from the engine 54 to the wheels 56. In certain embodiments, as discussed in greater detail below, the transmission arrangement 52 may include one or more IVTs.

The cotton stripper 50 is also configured to support a set of forward harvesting (or "row") units 58 for gathering cotton. As depicted, the harvesting units 58 include various brush rolls 60, which rotate during operation of the units 58 to pull bolls (and other material) from cotton plants. Bolls gathered by the harvesting units 58 are moved by air pressure through a duct arrangement 62 into the body 64 of the cotton stripper 50 (e.g., for cleaning and other operations). In the configuration depicted, and as discussed in greater detail below, the harvesting units 58 may also receive operating power from the engine 54 via the transmission arrangement 52. As depicted, for example, each individual harvesting unit 58 (or a set of multiple harvesting units 58) may be mechanically powered by a corresponding drive shaft 66 extending from the transmission arrangement 52 to the respective harvesting unit 58. In other embodiments, a different arrangement (e.g., an arrangement of various shafts, gears or other power-transmission devices) may be utilized to communicate power from the transmission arrangement 52 to the harvesting units 58.

The cotton stripper 50 may include various other devices and systems. As depicted, for example, the cotton stripper 50 includes a controller 68. The controller 68 may be configured in a variety of ways, including as an electronic computing device with one or more processors and memory architectures, as a programmable electronic circuit, and so on. In certain embodiments, the controller 68 may be disposed at other locations, including locations remotely located from the cotton stripper 50. In certain embodiments, multiple controllers may be utilized. For example, the controller 68 may be configured as a transmission control unit for controlling operation of various clutch (or other) devices the transmission arrangement 52, and another controller (not shown) may be configured as an engine control unit for controlling operation of the engine 54.

Figure 2:
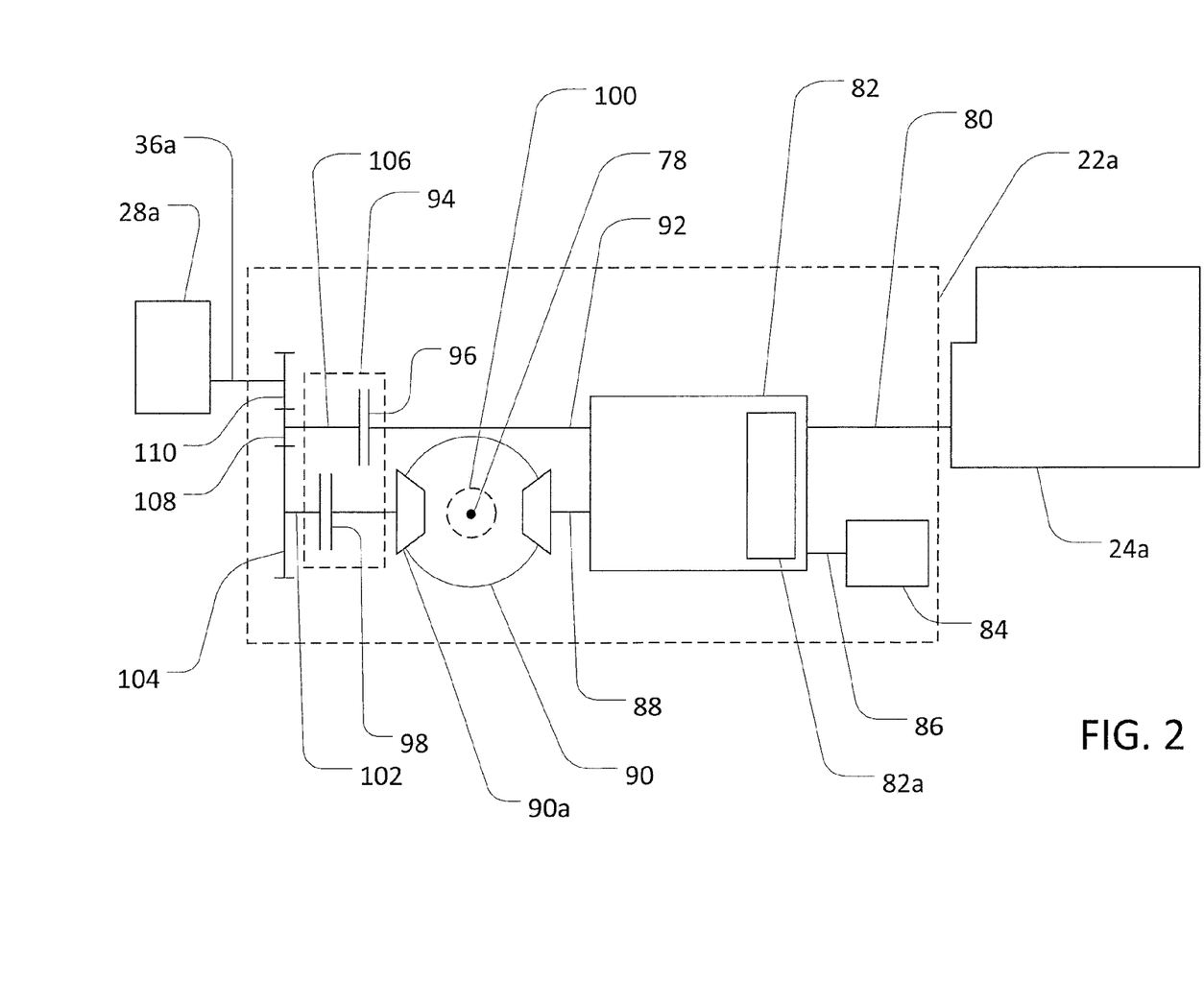
FIG. 2 is a schematic view of an example power train of the harvesting vehicle of FIG. 1A, including an example transmission arrangement.

Referring also to FIG. 2, an example embodiment of a transmission arrangement for use with the cotton picker 20 (or other harvesting vehicles) is depicted as transmission arrangement 22a. In the embodiment depicted, power from an engine 24a is provided by an engine output shaft 80 to an IVT 82. As noted above, an IVT may be generally configured to sum power from an IVP device and an engine in order to provide an infinitely variable power output. As depicted, for example, the IVT 82 is configured to sum rotational power received from the engine 24a via the shaft 80 with rotational power received from an IVP 84 (e.g., an electric or hydraulic motor) via an IVP output shaft 86. The summed power may then be output from the IVT 82 along an IVT output shaft 88 (i.e., a "variable" output shaft).

Various known configurations may be utilized to sum power within the IVT 82. As depicted for example, the IVT 82 includes a planetary gear set 82a configured to receive power from the engine 24a at a sun gear (not shown), receive power from the IVP 84 at a ring gear (not shown), and output summed power to the variable output shaft 88 via a set of planetary gears and a planetary gear carrier (not shown). Other configurations may also be possible. In certain embodiments, a power-shift (or other) transmission (not shown) configured as a multi-stage gear box may be disposed between the engine 24a and the planetary gear set 82a (or other component of the IVT 82), such that power from the engine may be subjected to one of various fixed gear ratios before being combined with power from the IVP 84 within the IVT 82. In certain embodiments, the IVT 82 may be entirely replaced with a power-shift (or other) transmission configured as a multi-stage gear box for transmitting power from an input at the shaft 80 to an output at the shaft 88.

Power from the IVT 82 may be routed to a ground drive, in order to power movement of the cotton picker 20 over a field. A ground drive may be configured in various ways, including as a simple axle assembly for rotating a set of wheels (or other ground-engaging elements), as a planetary or other gear set configured to control rotation of wheels (or other ground-engaging elements) on either side of the cotton picker 20, or in various other ways. As depicted, for example, the variable output shaft 88 extends from the IVT 82 to a differential gear set 90, which is configured to transmit rotational power over an axle assembly 78 to each of the wheels 26, in order to power movement of the cotton picker 20 over a field. It will be understood that other configurations may be possible, including ground drives with differently configured differential gear sets, or other power transmission elements.

In addition to powering rotation of the wheels 26 (or other ground-engaging elements) via the ground drive (e.g., via the differential gear set 90, as depicted) the engine 24a may also power operation of various harvesting units 28a. In the embodiment depicted, the engine 24a may controllably power the harvesting units 28a via various combinations of the variable output shaft 88, a power take-off ("PTO") shaft 92, and a controllable clutch arrangement 94.

Generally, the PTO shaft 92 (or other PTO shafts) may be configured to receive rotational power directly from the engine 24a, such that the PTO shaft 92 may generally rotate at a speed that is synchronized with the operating speed of the engine 24a. As depicted, the PTO shaft 92 extends from the IVT 82 in parallel with the variable output shaft 88, and is generally coaxial with the engine output shaft 80. It will be understood, however, that other configurations may be possible. In certain embodiments, the PTO shaft 92 may be an extension of (e.g., integrally formed with, or coaxially connected to) the engine output shaft 80. In certain embodiments, the PTO shaft 92 may be offset from, or non-parallel with, the engine output shaft 80.

As depicted, the PTO shaft 92 passes through a housing of the IVT 82, although the PTO shaft 92 is not configured to receive rotational power from the IVP 84 (e.g., via the summing functionality of the IVT 82). In certain embodiments, the PTO shaft 92 may not pass through the housing of the IVT 82 (i.e., may bypass the IVT 82). For example, the PTO shaft 92 may be configured to extend in parallel with the variable output shaft 88 and the engine output shaft 80, but outside of the housing of the IVT 82.

As discussed in greater detail below, in a first state of the clutch arrangement 94 (or another clutch arrangement), the PTO shaft 92 may be disconnected from the harvesting units 28a, and power may be routed from the variable output shaft 88 to the harvesting units 28a. In a second state of the clutch arrangement 94, the variable output shaft 88 may be disconnected from the harvesting units 28a, and power may be routed from the PTO shaft 92 to the harvesting units 28a. In this way, for example, the harvesting units 28a may receive rotational power that is synchronized with the operating speed of the engine 24a or that is variably controlled via the IVT 82, depending on the state of the clutch arrangement 94. In certain implementations, because the variable output shaft 88 may be configured also to drive the wheels 26 (or other ground-engaging elements), the power received at the harvesting units 28a may be synchronized with the ground speed of the cotton picker 20 when the clutch arrangement 94 is in the second state.

The clutch arrangement 94 may be configured in various ways in order to provide at least the two clutch states noted above. In the embodiment depicted, for example, the clutch arrangement 94 includes a PTO clutch 96 and a variable-shaft clutch 98, each configured as a friction-disk clutch controlled by the controller 38 (see FIG. 1A). In the first state of the clutch arrangement 94, the controller 38 may cause the clutch 98 to engage and the clutch 96 to disengage. In this way, in the first state of the clutch arrangement 94, the PTO shaft 92 may be disconnected from the harvesting units 28a, and power from the engine 24a (and/or the IVP 84) may be routed to the harvesting units 28a via the IVT 82, the variable output shaft 88, the differential 90 (e.g., via the pinion gear 90a), and the clutch 98. In contrast, in the second state of the clutch arrangement 94, the controller 38 may cause the clutch 98 to disengage and the clutch 96 to engage. In this way, in the second state of the clutch arrangement 94, the variable output shaft 88 (and the IVT 82) may be disconnected from the harvesting units 28a, and power from the engine 24a may be routed to the harvesting units 28a via the PTO shaft 92 and the PTO clutch 96.

It will be understood that various alternative (or additional) configurations of the clutch devices (and other components) of the clutch arrangement 94 may be possible. For example, the PTO clutch 96 may alternatively be configured as a shift collar (not shown) configured to controllably connect a spur gear 108 to the PTO shaft 92, or the variable-shaft clutch 98 may alternatively be configured as a shift collar (not shown) configured to controllably connect a spur gear 104 to the shaft 102.

In certain embodiments, other states of the clutch arrangement 94 (or another clutch arrangement) may be possible. For example, still referring to FIG. 2, one or more ground-drive clutches 100 may be configured to control the routing of power from the differential gear set 90 to the axle assembly 78 (or other ground drive). The clutches 100 (which may be viewed as part of the clutch arrangement 94) may be controlled by the controller 38 (or otherwise) such that, when the clutches 100 are engaged, power may be routed from the differential gear set 90 to the wheels 26 via the clutches 100, and, when the clutches 100 are disengaged, power may not be routed from the differential gear set 90 to the wheels 26 (i.e., the ground drive may be disconnected from the IVT 82 and the engine 24a). In a third state of the clutch arrangement 94, the clutches 100 may be disengaged, such that the wheels 26 are disconnected from the engine 24a and the IVT 82. Depending on the state of the clutches 96 and 98, power from the engine 24a or the IVP 84 may then be routed to harvesting units 28a, without the wheels 26 receiving operating power.

Power may be transmitted from the clutch arrangement 94 (or another clutch arrangement) to the harvesting units 28a in various ways. As depicted, for example, an output shaft 102 extends from the clutch 98 to the spur gear 104, and another output shaft 106 extends from the clutch 96 to the spur gear 108. The gear 104 is meshed with the gear 108, and the gear 108 is meshed with still another spur gear 110, such that power from the both of the clutches 96 and 98 may be transmitted to a drive shaft 36a for the harvesting unit 28a via the gears 108 and 110. In other example embodiments, other configurations may be utilized. In certain embodiments, a set of bevel gears (not shown) or other components may allow for a change in the rotational axis of the power transmitted between the gear 110 (or another component) and the harvesting units 28a.

Figure 3:
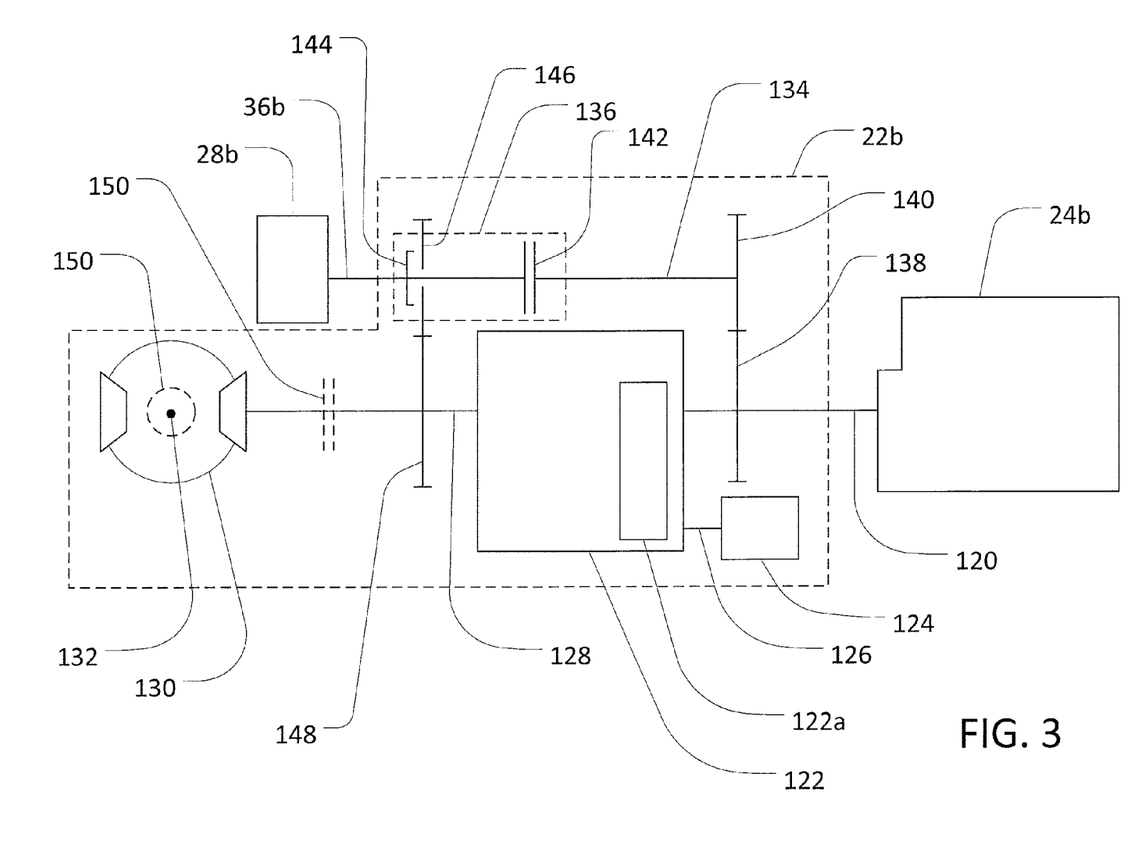
FIG. 3 is a schematic view of another example power train of the harvesting vehicle of FIG. 1A, including another example transmission arrangement.

Referring also to FIG. 3, another example embodiment of a transmission arrangement for use with the cotton picker 20 (or other harvesting vehicles) is depicted as transmission arrangement 22b. In the embodiment depicted, power from an engine 24b is provided by an engine output shaft 120 to an IVT 122. As noted above, an IVT may be generally configured to sum power from an IVP device and an engine in order to provide an infinitely variable power output. As depicted, for example, the IVT 122 is configured to sum rotational power received from the engine 24b via the shaft 120 with rotational power received from an IVP 124 (e.g., an electric or hydraulic motor) via an IVP output shaft 126. The summed power may then be output from the IVT 122 along an IVT output shaft 128 (i.e., a "variable" output shaft).

Various known configurations may be utilized to sum power within the IVT 122. As depicted, for example, the IVT 122 includes a planetary gear set 122a configured to receive power from the engine 24b at a sun gear (not shown), receive power from the IVP 124 at a ring gear (not shown), and output summed power to the variable output shaft 128 via a set of planetary gears and a planetary gear carrier (not shown). Other configurations may also be possible. In certain embodiments, a power-shift (or other) transmission (not shown) configured as a multi-stage gear box may be disposed between the engine 24b and the planetary gear set 82a (or other component of the IVT 122), such that power from the engine may be subjected to one of various fixed gear ratios before being combined with power from the IVP 124 within the IVT 122. In certain embodiments, the IVT 122 may be entirely replaced with a power-shift (or other)

transmission configured as a multi-stage gear box for transmitting power from an input at the shaft 120 to an output at the shaft 128.

Power from the IVT 122 may be routed to a ground drive, in order to power movement of the cotton picker 20 over a field. As depicted, for example, the variable output shaft 128 extends from the IVT 122 to a differential gear set 130, which is configured to transmit rotational power over an axle assembly 132 to each of the wheels 26, in order to power movement of the cotton picker 20 over a field. It will be understood that other configurations may be possible, including ground drives with differently configured differential gear sets, or other power transmission elements.

In addition to powering rotation of the wheels 26 (or other ground-engaging elements) via the ground drive (e.g., via the differential gear set 130, as depicted) the engine 24b may also power operation of various harvesting units 28b. In the embodiment depicted, the engine 24b may controllable power the harvesting units 28a via various combinations of the variable output shaft 128, a PTO shaft 134, and a controllable clutch arrangement 136.

Generally, the PTO shaft 134 (or other PTO shafts) may be configured to receive rotational power directly from the engine 24b, such that the PTO shaft 134 may generally rotate at a speed that is synchronized with the operating speed of the engine 24b. As depicted, for example, the PTO shaft 134 is connected to the engine output shaft 120 via two spur gears 138 and 140. Also as depicted, the PTO shaft 134 extends generally in parallel with the engine output shaft 120 and the variable output shaft 128. It will be understood, however, that other configurations may be possible. In certain embodiments, the PTO shaft 134 may be an extension of (e.g., integrally formed with, or coaxially connected to) the engine output shaft 120. In certain embodiments, the PTO shaft 134 may be offset from, or non-parallel, with the engine output shaft 120.

As depicted, the PTO shaft 134 passes outside a housing of the IVT 122 (i.e., bypasses the IVT 122), extending generally in parallel with the engine output shaft 120 and the variable output shaft 128. In certain embodiments, the PTO shaft 134 may instead extend through the housing of the IVT 122, although the PTO shaft 134 may be configured not to receive rotational power from the IVP 124 (i.e., via the summing functionality of the IVT 122).

As discussed in greater detail below, in a first state of the clutch arrangement 136 (or another clutch arrangement), the PTO shaft 134 may be disconnected from the harvesting units 28b, and power may be routed from the variable output shaft 128 to the harvesting units 28b. In a second state of the clutch arrangement 136, the variable output shaft 128 may be disconnected from the harvesting units 28b, and power may be routed from the PTO shaft 134 to the harvesting units 28b. In this way, for example, the harvesting units 28b may receive rotational power that is synchronized with the operating speed of the engine 24b or that is variably controlled via the IVT 122, depending on the state of the clutch arrangement 136. In certain implementations, because the variable output shaft 128 may be configured also to drive the wheels 26 (or other ground-engaging elements), the power received at the harvesting units 28b may be synchronized with the ground speed of the cotton picker 20 when the clutch arrangement 136 is in the second state.

The clutch arrangement 136 may be configured in various ways in order to provide at least the two clutch states noted above. In the embodiment depicted, for example, the clutch arrangement 136 includes a PTO clutch 142 configured as a friction-disk clutch, and a variable-shaft clutch 144 configured as a shift collar to controllably route power between a spur gear 146 and the PTO shaft 134. In such a configuration, each of the clutches 142 and 144 may be configured to be controlled by the controller 38 (see FIG. 1A), or various other controllers. In the first state of the clutch arrangement 136, the controller 38 may cause the clutch 144 to engage and the clutch 142 to disengage. In this way, in the first state of the clutch arrangement 136, the PTO shaft 134 may be disconnected from the harvesting units 28b, and power from the engine 24b (and/or the IVP 124) may be routed to the harvesting units 28b via the IVT 122, the variable output shaft 128, a gear 148 on the variable output shaft 128, the gear 146, and the clutch 144. In contrast, in the second state of the clutch arrangement 136, the controller 38 may cause the clutch 144 to disengage and the clutch 142 to engage. In this way, in the second state of the clutch arrangement 136, the variable output shaft 128 (and the IVT 122) may be disconnected from the harvesting units 28b, and power from the engine 24b may be routed to the harvesting units 28b via the gears 138 and 140, the PTO shaft 134, and the PTO clutch 142.

It will be understood that various alternative (or additional) configurations of the clutch devices (and other components) of the clutch arrangement 136 may be possible. For example, the PTO clutch 142 may alternatively be configured as a shift collar (not shown) configured to controllably connect the gear 140 to the PTO shaft 134, or the gear 138 to the engine output shaft 120, in order to control the powering of the PTO shaft 134 by the engine 24b. Similarly, the gear 146 may be fixed to the PTO shaft 134, and the variable-shaft clutch 144 may alternatively be configured to controllably route power between the variable output shaft 128 and the gear 148.

In certain embodiments, other states of the clutch arrangement 136 (or another clutch arrangement) may be possible. For example, still referring to FIG. 3, one or more ground-drive clutches 150 may be configured to control the routing of power from the IVT 122 (and the engine 24b) to the axle assembly 132 (or other ground drive). The clutches 150 (which may be viewed as part of the clutch arrangement 136) may be controlled by the controller 38 (or otherwise) such that, when the clutches 150 are engaged, power may be routed from the IVT 122 to the wheels 26 via the clutches 150, and, when the clutches 150 are disengaged, power is not routed from the IVT 122 to the wheels 26 (i.e., the ground drive may be disconnected from the IVT 122 and the engine 24b). In a third state of the clutch arrangement 136, the clutches 150 may be disengaged, such that the wheels 26 are disconnected from the engine 24b and the IVT 122. Depending on the state of the clutches 142 and 144, power from the engine 24b or the IVP 124 may then be routed to harvesting units 28b, without the wheels 26 receiving operating power.

Power may be transmitted from the clutch arrangement 136 (or another clutch arrangement) to the harvesting units 28b in various ways. As depicted, for example, a drive shaft 36b for the harvesting units 28b extends coaxially with the PTO shaft 134 (e.g., integrally with the PTO shaft 134) in order to transmit operational power from the clutch arrangement 136 to the harvesting units 28b. In other example embodiments, a set of bevel gears (not shown) or other components may allow for a change in the rotational axis of the power transmitted between the gear 110 (or another component) and the harvesting units 28b.

As illustrated in the examples above, various transmission arrangements 22 (e.g., arrangements 22a and 22b) may be utilized to control the routing of operational power to the harvesting units 28 of the cotton picker 20. Accordingly, via control of the transmission arrangements 22, the operating speed of the harvesting units 28 may also be controlled. This may be useful, for example, in order to ensure relatively optimal operating speeds for the harvesting units 28 at various ground speeds of the cotton picker 20. For example, at lower ground speeds, it may be useful to generally synchronize the operating speed of the harvesting units 28 with the ground speed of the cotton picker 20 (i.e., to cause the harvesting units 28 to operate at a speed that is generally proportional to the ground speed of the cotton picker 20). At higher ground speeds, however, it may be useful to de-synchronize the operating speed of the harvesting units 28 with the ground speed of the cotton picker 20 (e.g., to maintain a relatively constant operating speed for the harvesting units 28, even for increasing ground speeds of the cotton picker 20). Various control strategies for various transmission arrangements 22 may facilitate this control of harvesting unit speed, with respect to ground speed.

Figure 4:
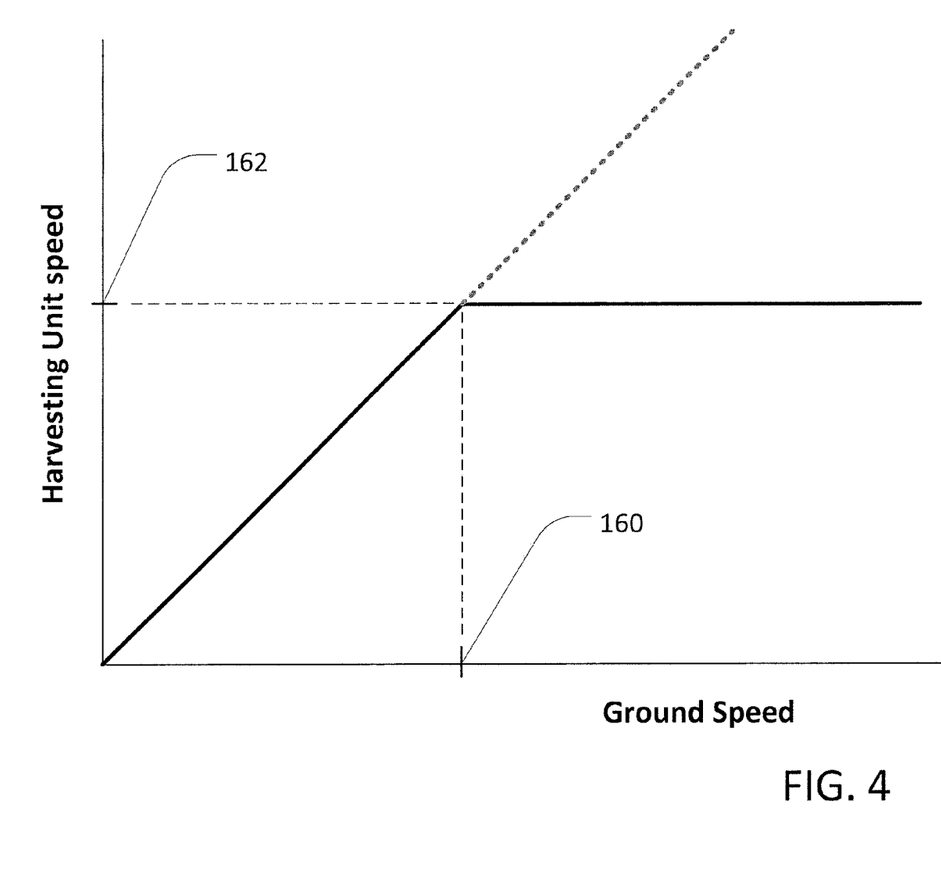
FIG. 4 is a graphical representation of harvesting-unit operating speeds and ground speeds for the harvesting vehicle of FIG. 1A.

Referring also to FIG. 4, an example control strategy is represented for a configuration of the cotton picker 20 with generally isochronous operation of the engine 24. With regard to the transmission arrangement 22a (see FIG. 2), for example, as the cotton picker 20 travels at ground speeds below a maximum synchronization speed 160 (or, correspondingly, with the harvesting units 28a operating at speeds below a maximum synchronization speed 162), it may assist in effective harvesting to generally synchronize the operating speeds of the harvesting units 28a with the ground speed. Further, the ground speed of the cotton picker 20 may be such that operating the harvesting units 28a at speeds synchronized to the engine speed could result in excessive operating speeds for the harvesting units 28a (e.g., with respect to the current ground speed). Accordingly, the controller 38 may cause the clutch 98 to engage and the clutch 96 to disengage (see FIG. 2), such that power is routed to the harvesting units 28a via the variable output shaft 88 of the IVT 82, and the operating speed of the harvesting units 28a is generally synchronized with the ground speed of the cotton picker 20. Once the maximum synchronization speed 160 (or 162) is reached, the controller 38 may then cause the clutch 96 to engage and the clutch 98 to disengage, such that power is routed to the harvesting units 28a via the PTO shaft 92 and the operating speed of the harvesting units 28a is generally synchronized with the operating speed of the engine 24a. For operation of the engine 24a under control of an isochronous governor, the operating speed of the harvesting units 28a may then be maintained at a relatively constant value (e.g., at the maximum synchronization speed 162).

Similar control may also be implemented, for example, with regard to the transmission arrangement 22b (see FIG. 3). For example, as the cotton picker 20 travels at ground speeds below the maximum synchronization speed 160 (or, correspondingly with the harvesting units 28b operating at harvesting unit speeds below the maximum synchronization speed 162), it may assist in effective harvesting to generally synchronize the operating speeds of the harvesting units 28b with the ground speed. Further, the ground speed of the cotton picker 20 may be such that operating the harvesting units 28b at speeds synchronized to the engine speed could result in excessive operating speeds for the harvesting units 28b (e.g., with respect to the current ground speed). Accordingly, the controller 38 may cause the clutch 144 to engage and the clutch 142 to disengage (see FIG. 2), such that power is routed to the harvesting units 28b via the variable output shaft 128 of the IVT 122, and the operating speed of the harvesting units 28b is generally synchronized with the ground speed of the cotton picker 20. Once the maximum synchronization speed 160 (or 162) is reached, the controller 38 may then cause the clutch 142 to engage and the clutch 144 to disengage, such that power is routed to the harvesting units 28b via the PTO shaft 134 and the operating speed of the harvesting units 28b is generally synchronized with the operating speed of the engine 24a. For operation of the engine 24b under control of an isochronous governor, the operating speed of the harvesting units 28b may be maintained at a relatively constant value (e.g., at the maximum synchronization speed 162).

Figures 5A, 5B:
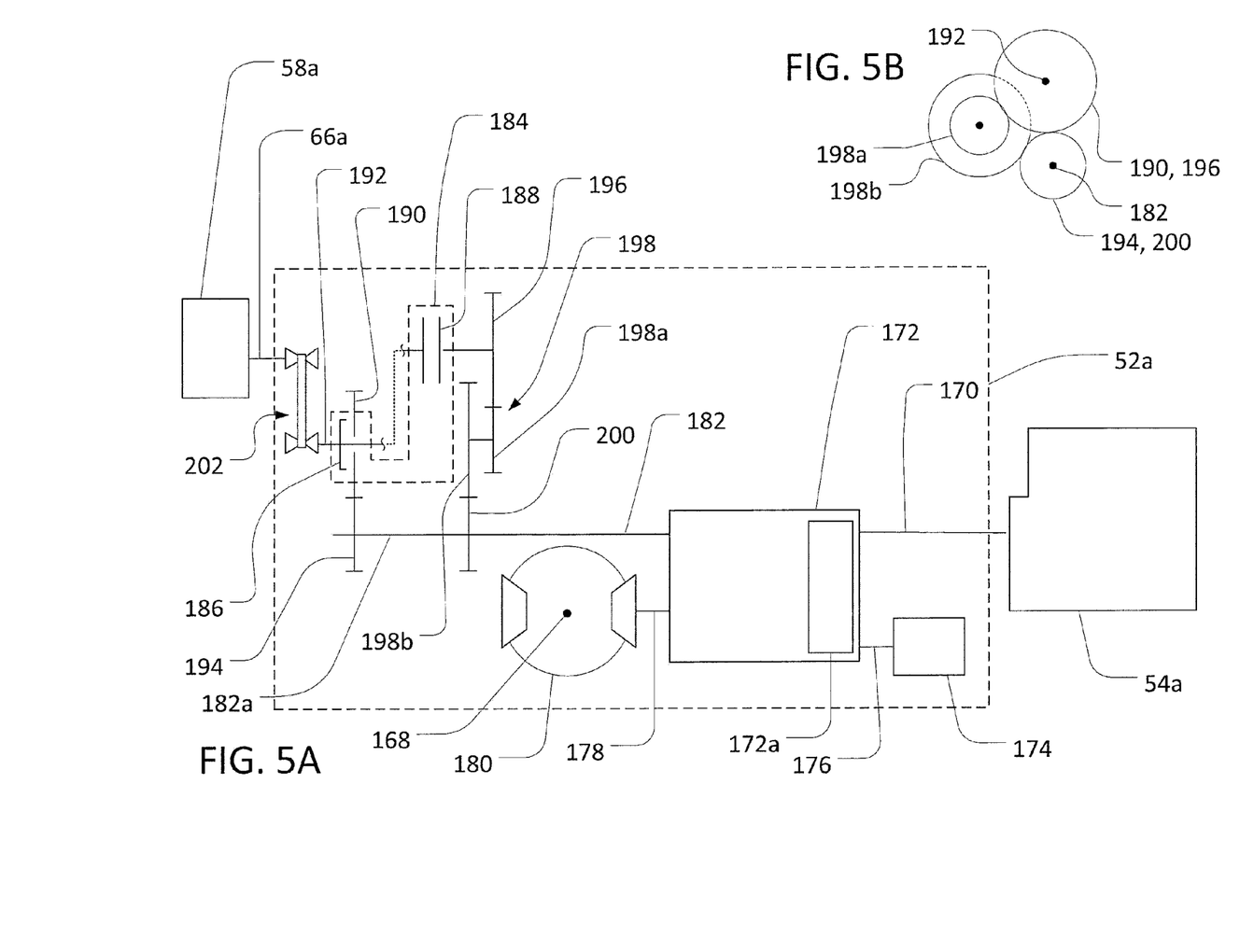
FIG. 5A is a schematic view of an example power train of the harvesting vehicle of FIG. 1B, including an example transmission arrangement.
FIG. 5B is a schematic view of a gear arrangement of the power train of FIG. 5B.

Other configurations of a transmission arrangement according to this disclosure may also be possible. Referring also to FIG. 5A, for example, an example embodiment of the transmission arrangement 52 (see FIG. 1B) is depicted as transmission arrangement 52a. In the embodiment depicted, power from an engine 54a is provided by an engine output shaft 170 to an IVT 172. As noted above, an IVT may be generally configured to sum power from an IVP device and an engine in order to provide an infinitely variable power output. As depicted, for example, the IVT 172 is configured to sum rotational power received from the engine 54a via the shaft 170 with rotational power received from an IVP 174 (e.g., an electric or hydraulic motor) via an IVP output shaft 176. The summed power may then be output from the IVT 172 along an IVT output shaft 178 (i.e., a "variable" output shaft).

Various known configurations may be utilized to sum power within the IVT 172. As depicted for example, the IVT 172 includes a planetary gear set 172a configured to receive power from the engine 54a at a sun gear (not shown), receive power from the IVP 174 at a ring gear (not shown), and output summed power to the variable output shaft 178 via a set of planetary gears and a planetary gear carrier (not shown). Other configurations may also be possible. In certain embodiments, a power-shift (or other) transmission (not shown) configured as a multi-stage gear box may be disposed between the engine 54a and the planetary gear set 172a (or other component of the IVT 172), such that power from the engine may be subjected to various fixed gear ratios before being combined with power from the IVP 174 within the IVT 172. In certain embodiments, the IVT 172 may be entirely replaced with a power-shift (or other) transmission configured as a multi-stage gear box for transmitting power from an input at the shaft 170 to an output at the shaft 178.

Power from the IVT 172 may be routed to a ground drive, in order to power movement of the cotton stripper 50 over a field. As depicted, for example, the variable output shaft 178 extends from the IVT 172 to a differential gear set 180, which is configured to transmit rotational power over an axle assembly 168 to each of the wheels 56, in order to power movement of the cotton stripper 50 over a field. It will be understood that other configurations may be possible, including ground drives with differently configured differential gear sets, or other power transmission elements.

In addition to powering rotation of the wheels 56 (or other ground-engaging elements) via the ground drive (e.g., via the differential gear set 180, as depicted) the engine 54a may also power operation of various harvesting units 58a. In the embodiment depicted, the engine 54a may controllably power the harvesting units 58a via various combinations of the variable output shaft 178, a power take-off ("PTO") shaft 182, and a controllable clutch arrangement 184.

Generally, the PTO shaft 182 (or other PTO shafts) may be configured to receive rotational power directly from the engine 54a, such that the PTO shaft 182 may generally rotate at a speed that is synchronized with the operating speed of the engine 54a. As depicted, the PTO shaft 182 extends from the IVT 172 in parallel with the variable output shaft 178, and is generally coaxial with the engine output shaft 170. It will be understood, however, that other configurations may be possible. In certain embodiments, the PTO shaft 182 may be an extension of (e.g., integrally formed with, or coaxially connected to) the engine output shaft 170. In certain embodiments, the PTO shaft 182 may be offset from, or non-parallel with, the engine output shaft 170.

As depicted, the PTO shaft 182 passes through a housing of the IVT 172, although the PTO shaft 182 is not configured to receive rotational power from the IVP 174 (e.g., via the summing functionality of the IVT 172). In certain embodiments, the PTO shaft 182 may not pass through the housing of the IVT 172. For example, the PTO shaft 182 may be configured to extend in parallel with the variable output shaft 178 and the engine output shaft 170, but outside of the housing of the IVT 172.

As discussed in greater detail below, in a first state of the clutch arrangement 184 (or another clutch arrangement), the PTO shaft 182 may be connected to the harvesting units 58a such that rotational power with a first rotational direction is provided to the harvesting units 58a. In a second state of the clutch arrangement 184, the PTO shaft 182 may be connected to the harvesting units 58a such that rotational power with a first rotational direction is provided to the harvesting units 58a. In this way, for example, the harvesting units 58a may receive rotational power for forward operation or reverse operation, depending on the state of the clutch arrangement 184. In the embodiment depicted, the rotational speed of the harvesting units 58a may be generally synchronized with the operating speed of the engine 54a in both of the noted clutch states. It will be understood, however, that other configurations may be possible.

The clutch arrangement 184 may be configured in various ways in order to provide at least the two clutch states noted above. In the embodiment depicted, for example, the clutch arrangement 184 includes a forward clutch 186 configured as a shift collar, and a reverse clutch 188 configured as a friction-disk clutch, each of which may be controlled by the controller 68 (see FIG. 1B). In the first state of the clutch arrangement 184, the controller 68 may cause the clutch 186 to engage and the clutch 188 to disengage. In this way, in the first state of the clutch arrangement 184, power may be routed from the PTO shaft 182 to the harvesting units 58a in order to provide rotational power for forward operation of the harvesting units 58a. In contrast, in the second state of the clutch arrangement 184, the controller 68 may cause the clutch 186 to disengage and the clutch 188 to engage. In this way, in the second state of the clutch arrangement 184, power may be routed from the PTO shaft 182 to the harvesting units 58a in order to provide rotational power for reverse operation of the harvesting units 58a.

As depicted, for example, the forward clutch 186 is configured to route power between a spur gear 190 and a clutch-arrangement output shaft 192, with the spur gear 190 receiving power from the PTO shaft 182 via another spur gear 194 fixed to the PTO shaft 182. Also as depicted, the reverse clutch 188 is configured such that power that is received at a spur gear 196 from the PTO shaft 182 via an idler gear component 198 and another spur gear 200 may be routed along the clutch-arrangement output shaft 192 to the harvesting units 58a. As depicted, the idler gear component 198 includes two gears 198a and 198b, such that a speed reduction may be imposed between the PTO shaft 182 and the gear 196. In other configurations, other idler gear components, such as a single idler gear may be utilized.

It will be understood that various alternative (or additional) configurations of the clutch devices (and other components) of the clutch arrangement 184 may be possible. For example, the forward clutch 186 may alternatively be configured as a shift collar (not shown) configured to controllably connect the spur gear 194 to the PTO shaft 182, or as a friction-disk clutch (not shown) disposed along a portion 182a of the PTO shaft 182 between the gears 194 and 200. Similarly, the reverse clutch 188 may alternatively be configured as a shift collar (not shown) configured to controllably connect the gear 196 to the clutch-arrangement output shaft 192, or to controllably connect the gear 200 to the PTO shaft 182.

In FIG. 5A, for convenience of presentation, certain gears (e.g., the idler gear component 198) are presented somewhat out of alignment with the actual physical location of the gears, and the clutch-arrangement output shaft 192 is shown as a broken line. It will be understood, accordingly, that the actual physical arrangement of the gears and shafts of the transmission arrangement 52a may vary somewhat from the view presented in FIG. 5A. For example, the shaft 192 (in various embodiments) may extend as a single body along a single axis of rotation between the clutches 186 and 188, and the rotational axis of the idler gear component 198 may be somewhat offset (e.g., into the page in FIG. 5A) from the rotational axes of the PTO shaft 182 and the clutch-arrangement output shaft 192. To further clarify the configuration of the example arrangement presented in FIG. 5A, a schematic depiction of the disposition of certain gears and shafts of FIG. 5A is presented from an end-view perspective in FIG. 5B.

Power may be transmitted from the clutch arrangement 184 (or another clutch arrangement) to the harvesting units 58a in various ways. In certain embodiments, the clutch-arrangement output shaft 192 may extend directly from the clutch arrangement 184 to the harvesting units 58a. In certain embodiments, other components may be interposed between the shaft 192 and the harvesting units 58a. For example, a set of bevel gears (not shown) or other components may allow for a change in the rotational axis of the power transmitted between the gear 110 (or another component) and the harvesting units 28a. As another example, a variable drive mechanism such as a variable speed drive or an additional IVT (or similar arrangement) may be disposed between the clutch-arrangement output shaft 192 (or another component of the transmission arrangement 52a) and the harvesting units 58a. For example, as depicted in FIG. 5A, a variable drive 202 (e.g., a variable belt or chain drive) may be configured to transmit power between the clutch-arrangement output shaft 192 and a harvesting unit drive shaft 58a. In this way, through control of the variable drive 202, a variable effective gear ratio may be implemented between the shafts 192 and 66a. In certain implementations, the variable drive 202 may be configured to vary the effective gear ratio (e.g., as controlled by the controller 68), such that a relatively constant operating speed is maintained at the harvesting units 58a over a range of engine speeds. For example, the controller 68 may cause the variable drive 202 to vary the effective gear ration to maintain constant operating speed at the harvesting units 58a whenever the engine 54a is operating above a maximum synchronized speed (e.g., an engine speed corresponding to the maximum synchronized ground speed 162 (see FIG. 4)).

Various embodiments presented above may be described with respect to a particular vehicle (e.g., with respect to the cotton picker 20 or the cotton stripper 50). It will be understood that such presentation is by way of example only, and that various of the example embodiments described herein (and other embodiments apparent from this disclosure), may be utilized with respect to a variety of different vehicles. Further, it will be understood that various components or arrangements from certain example embodiments may be combined (or interchanged) with components or arrangements from other example embodiments in order to provide functionality within the scope of this disclosure. For example, the reversing capability described with respect to the embodiment of FIG. 5A may be utilized with variations of the embodiments of FIGS. 2 and 3 (and other embodiments). Likewise, a variable drive mechanism such as a variable belt or chain drive, an additional IVT, an additional IVP, and so on, may be utilized at various locations in the transmission arrangements 22a (see FIG. 2) and 22b (see FIG. 3), or in other transmission arrangements. For example, an additional IVT or IVP (not shown), or a variable belt (or chain) drive (not shown), may be disposed between the clutch arrangements 94 and 136 and the harvesting units 28a and 28b, respectively, in order to provide additional variability in the operating speeds of the harvesting units 28a and 28b (e.g., by varying the effective gear ratio between the clutch arrangements 94 and 136 and the harvesting units 28a and 28b, respectively).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A transmission arrangement for a cotton harvester with an engine, a ground-engaging element for moving the cotton harvester over a field, and at least one harvesting unit for gathering cotton, the transmission arrangement comprising:
    a power take-off shaft configured to receive rotational power from the engine;
    an infinitely variable transmission configured to sum mechanical power from an infinitely variable power source and the engine and to output the summed power at a variable output shaft; and
    a clutch arrangement configured to:
        in a first state, disconnect the harvesting unit from the power take-off shaft and route power from the variable output shaft to the harvesting unit; and
        in a second state, disconnect the harvesting unit from the variable output shaft and route power from the engine to the harvesting unit via the power take-off shaft.

2. The transmission arrangement of claim 1, further comprising:
    transmission control unit configured to:
        place the clutch arrangement in the first state when the cotton harvester is traveling below a maximum synchronized speed; and
        place the clutch arrangement in the second state when the the cotton harvester is traveling above the maximum synchronized speed.

3. The transmission arrangement of claim 1, wherein the clutch arrangement is further configured, when in a third state, to disconnect the ground-engaging element from the variable output shaft and to route power to the harvesting unit from at least one of the power take-off shaft and the variable output shaft.

4. The transmission arrangement of claim 1, further comprising:
    a variable drive mechanism configured to transmit power from the engine to the harvesting unit with a variable effective gear ratio.

5. The transmission arrangement of claim 4, wherein the variable drive mechanism is configured to vary the effective gear ratio such that the harvesting unit operates at a substantially constant speed over a range of operating speeds of the engine.

6. The transmission arrangement of claim 5, wherein the variable drive mechanism is configured to vary the effective gear ratio to operate the harvesting unit at the substantially constant speed when the engine is operating above a maximum synchronized speed.

7. The transmission arrangement of claim 1, wherein the power take-off shaft is configured to receive rotational power directly from the engine and to transmit the received rotational power directly to the harvesting unit.

8. The transmission arrangement of claim 1, wherein the clutch arrangement includes a first clutch device configured to route power from the variable output shaft to the harvesting unit, when the clutch arrangement is in the first state.

9. The transmission arrangement of claim 8, wherein the first clutch device is configured to receive power from the variable output shaft via a differential gear set that is configured to power the ground-engaging element.

10. The transmission arrangement of claim 8, wherein when the clutch arrangement includes a second clutch device configured to route power from the engine to the harvesting unit, via the power take-off shaft, when the clutch arrangement is in the second state.

11. The transmission arrangement of claim 1, further comprising:
    a gear arrangement configured to transmit power directly from the variable output shaft to the harvesting unit, when the clutch arrangement is in the first state.

12. The transmission arrangement of claim 11, wherein the gear arrangement is disposed between the infinitely variable transmission and a differential gear set that is configured to power the ground-engaging element.

13. The transmission arrangement of claim 1, wherein the power take-off shaft is configured to bypass the infinitely variable transmission to transmit power from the engine to the harvesting unit.

14. The transmission arrangement of claim 13, further comprising:
    a gear arrangement configured to transmit power directly from an output shaft of the engine to the power take-off shaft.

15. The transmission arrangement of claim 14, wherein the gear arrangement is disposed between the engine and the infinitely variable transmission.

16. A transmission arrangement for a cotton harvester with an engine, a ground-engaging element for moving the cotton harvester over a field, and at least one harvesting unit for gathering cotton, the transmission arrangement comprising:
- a power take-off shaft configured to provide operating power to the harvesting unit;
- a transmission assembly configured to receive power from the engine via one or more of a multi-stage gear box and an infinitely variable transmission, in order to rotate a transmission output shaft; and
- a clutch arrangement configured to:
  - in a first state, disconnect the harvesting unit from the power take-off shaft and route power from the transmission output shaft to the harvesting unit; and
  - in a second state, disconnect the harvesting unit from the transmission output shaft and route power from the engine to the harvesting unit via the power take-off shaft.

* * * * *